Oct. 21, 1930. P. C. ACKERMAN 1,778,822

SHAFT BEARING

Filed April 29, 1927

INVENTOR:
Paul C. Ackerman
by Carr Carr & Gravely
HIS ATTORNEYS

Patented Oct. 21, 1930

1,778,822

UNITED STATES PATENT OFFICE

PAUL C. ACKERMAN, OF CANTON, OHIO, ASSIGNOR TO THE TIMKEN ROLLER BEARING COMPANY, OF CANTON, OHIO, A CORPORATION OF OHIO

SHAFT BEARING

Application filed April 29, 1927. Serial No. 187,467.

My invention relates to anti-friction bearings for line shafting and other shafts and has for its principal object a construction that is easily applied to the shaft, that may be securely positioned notwithstanding inaccuracies in the size and shape of the shaft and irregularities in the finish thereof, that accommodates canting of the shaft and that provides for adjustment of the bearings. The invention consists in the shaft bearing and in the parts and combinations and arrangements of parts hereinafter described and claimed.

In the accompanying drawing wherein like reference characters indicate like parts wherever they occur.

Figure 1:
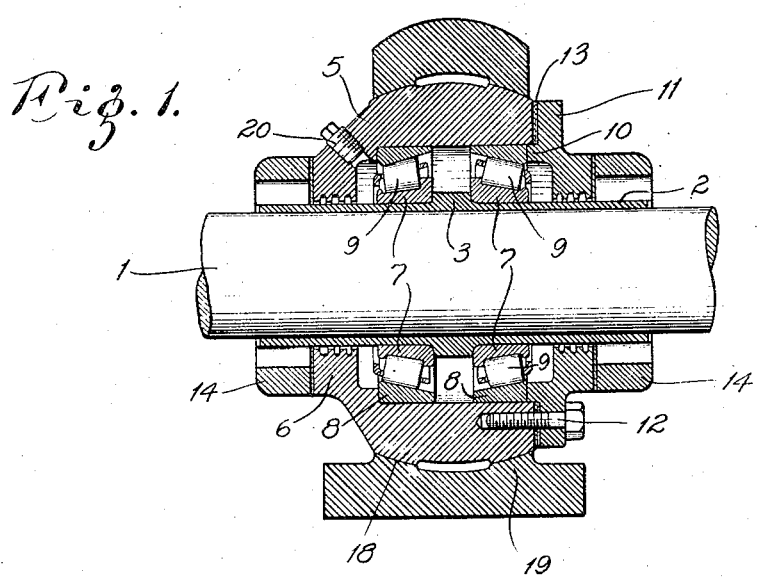
Fig. 1 is a longitudinal sectional view of a shaft bearing embodying my invention.
Figure 2:
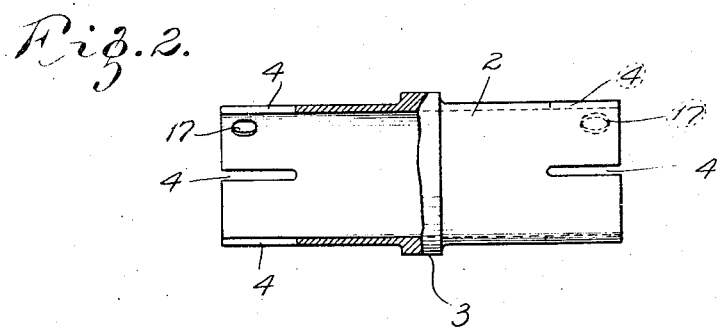
Fig. 2 is a part elevation, part longitudinal sectional view of the sleeve on which the bearings are mounted.
Figure 3:
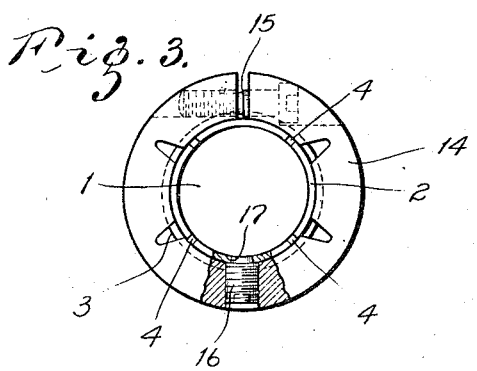
Fig. 3 is an end view of one of the collars for securing said sleeve to the shaft, the sleeve being shown in position in the collar.

Mounted on a shaft 1 is a sleeve 2 that has an annular rib 3 at the middle portion thereof and that is provided with a plurality of slots 4 in each end thereof. Said sleeve and shaft extend through a housing 5. Said housing has an end wall 6 that closely hugs the sleeve 2, thus preventing dust from entering the housing and lubricant from escaping therefrom.

Abutting against the sides of said rib 3 on said sleeve 2 are the large ends of the cones 7 or inner bearing members of conical roller bearings. The cups 8 or outer bearing members of the roller bearings are mounted in said housing 5 and the conical rollers 9 are interposed between the respective cups 8 and cones 7. One cup 8 abuts against the end wall portion 6 of the housing 5. The other cup 8 is adjustable in the housing and is held in position by means of an annular rib 10 on an end closure ring 11 that is secured to the open end of the housing 5 as by screws 12. Shims 13 are interposed between the closure ring 11 and the end of the housing, so that both bearings may be adjusted by removing one or more shims 13 and tightening up the closure ring 11 against the housing, thereby pushing the adjustable cup 8 further into the housing.

The sleeve 2 is held on the shaft by means of split collars 14 mounted on the slotted ends of the sleeve 2. The free ends of the collars are brought together by means of a screw 15, thereby clamping the collar firmly on the sleeve and clamping the sleeve 2 firmly on the shaft 1. Preferably each collar 14 has a positioning screw 16 therein whose end extends into a hole 17 in the sleeve. This prevents the collar from turning on the sleeve while being tightened.

The housing member preferably has a spherically curved peripheral portion 18 that rests in a concavely curved seat in a bracket or hanger member 19. The housing is provided with a plugged opening 20 through which lubricant may be admitted.

The above described construction may be easily applied to existing shafts and line shafting. The mounting sleeve may be slipped over the end of the shaft and moved along to any desired position. The sleeve adapts itself to inaccuracies and irregularities in the size, shape and surface finish of the shaft. The bearings may be easily adjusted. Canting of the shaft is accommodated by reason of the curvature of the housing member and its seat in the support.

What I claim is:

1. A shaft bearing comprising a shaft, an integral sleeve thereon, said sleeve being slotted at each end and having a middle annular rib thereon, a housing for said sleeve, said housing having an integral end wall portion at one end closely hugging said sleeve, bearing cones mounted on said sleeve with their large ends abutting against said rib, bearing cups mounted in said housing, one cup abutting against the end wall thereof, conical rollers interposed between said cups and cones, a closure ring for the open end of said housing, said ring having an annular rib extending into the housing and abutting against the other of said bearing cups, and integral split collars disposed on the slotted ends of said sleeve, said collars being each adapted to be drawn up tight against said sleeve.

2. A shaft bearing comprising a shaft, an integral sleeve thereon, said sleeve being slotted at each end and having a middle annular rib thereon, a housing for said sleeve, bearing cones mounted on said sleeve with their large ends abutting against said rib, bearing cups mounted in said housing, conical rollers interposed between said cups and cones, integral split collars disposed on the slotted ends of said sleeve, said collars being each adapted to be drawn up tight against said sleeve, said sleeve being provided with a hole near each end and a screw in each locking collar extending into one of said holes to position the collar on the sleeve.

3. A shaft bearing comprising a shaft, an integral sleeve thereon, said sleeve being slotted at each end and having a middle annular rib thereon, a housing for said sleeve, said housing having an end wall portion at one end closely hugging said sleeve, bearing cones mounted on said sleeve with their large ends abutting against said rib, bearing cups mounted in said housing, one cup abutting against the end wall thereof, conical rollers interposed between said cups and cones, a closure ring for the open end of said housing, said ring having an annular rib extending into the housing and abutting against the other of said bearing cups, shims interposed between said ring and said housing to permit adjustment of the bearings, integral split collars disposed on the slotted ends of said sleeve, said collars being each adapted to be drawn up tight against said sleeve, said sleeve being provided with a hole near each end and a screw in each locking collar extending into one of said holes to position the collar on the sleeve.

4. A shaft bearing comprising a bracket having an internal seat of concave curvature, a housing in said bracket having an external surface of convex curvature to fit said concave seat, a shaft extending through said housing, a sleeve on said shaft, said sleeve being slotted at each end and having a middle annular rib thereon, bearing cones on said sleeve with their large ends abutting against said rib, one end of said housing having an integral end wall, a bearing cup in said housing abutting against said end wall, a bearing cup adjustably mounted in the other end of said housing, conical rollers interposed between said cups and cones, a closure ring for the open end of said housing, said ring having an annular rib extending into said housing and abutting against said adjustable cup, and integral split collars disposed on the slotted ends of said sleeve and adapted to be drawn tight against said sleeve to hold said sleeve on said shaft.

Signed at Canton, Ohio, this 25th day of April, 1927.

PAUL C. ACKERMAN.